US009146890B1

(12) United States Patent
Brown et al.

(10) Patent No.: US 9,146,890 B1
(45) Date of Patent: Sep. 29, 2015

(54) METHOD AND APPARATUS FOR MAPPED I/O ROUTING IN AN INTERCONNECT SWITCH

(71) Applicant: PMC-SIERRA US, INC., Sunnyvale, CA (US)

(72) Inventors: David Alan Brown, Carp (CA); Peter Z. Onufryk, Flanders, NJ (US)

(73) Assignee: PMC—SIERRA US, INC., Sunnyvale, CA (US)

( * ) Notice: Subject to any disclaimer, the term of this patent is extended or adjusted under 35 U.S.C. 154(b) by 300 days.

(21) Appl. No.: 13/750,991

(22) Filed: Jan. 25, 2013

(51) Int. Cl.
G06F 13/00 (2006.01)
G06F 13/40 (2006.01)

(52) U.S. Cl.
CPC .................................. G06F 13/4022 (2013.01)

(58) Field of Classification Search
CPC . G06F 13/4022; G06F 13/385; G06F 3/0601; G06F 3/0635; G06F 3/0689
USPC .......................................................... 710/316
See application file for complete search history.

(56) References Cited

U.S. PATENT DOCUMENTS

| 6,253,289 | B1* | 6/2001 | Bates et al. | 711/137 |
| 8,429,325 | B1* | 4/2013 | Onufryk et al. | 710/316 |
| 8,917,734 | B1* | 12/2014 | Brown | 370/400 |
| 8,977,781 | B1* | 3/2015 | Yokoi et al. | 710/5 |
| 8,995,302 | B1* | 3/2015 | Brown et al. | 370/254 |
| 9,025,495 | B1 | 5/2015 | Brown et al. | |
| 2004/0193739 | A1* | 9/2004 | Shimizu et al. | 710/1 |
| 2005/0286511 | A1* | 12/2005 | Johnsen et al. | 370/389 |
| 2006/0039370 | A1* | 2/2006 | Rosen et al. | 370/389 |
| 2006/0085621 | A1* | 4/2006 | Tsukada et al. | 711/202 |
| 2008/0267081 | A1* | 10/2008 | Roeck | 370/249 |
| 2009/0067320 | A1* | 3/2009 | Rosenberg et al. | 370/216 |
| 2009/0164694 | A1* | 6/2009 | Talayco et al. | 710/316 |
| 2012/0096192 | A1* | 4/2012 | Tanaka et al. | 710/20 |
| 2012/0166690 | A1* | 6/2012 | Regula | 710/104 |
| 2013/0315252 | A1* | 11/2013 | Emmadi et al. | 370/395.53 |
| 2014/0185611 | A1* | 7/2014 | Lie et al. | 370/355 |
| 2015/0149996 | A1* | 5/2015 | Tsirkin et al. | 718/1 |

* cited by examiner

Primary Examiner — Faisal M Zaman
(74) Attorney, Agent, or Firm — Glass & Associates; Kenneth Glass

(57) ABSTRACT

A system and method are disclosed for a flexible routing engine in a PCIe switch. The system may include a switch manager that is enabled, through firmware, to configure one or more routing tables associated with a switch stack of a PCIe switch. To enable non-transparent bridging and non-standard routing, such as mapped I/O routing, the method may include receiving a transaction layer packet at a mapped I/O routed port of a PCIe switch, and performing translation of the requester ID of the packet utilizing tables that are updated by the firmware of the switch manager to route the packet through the switch.

19 Claims, 17 Drawing Sheets

| Field | Register | Requirement | Implementation |
|---|---|---|---|
| SERR# Enable | Control Register | PCIe Base Specification | F/W: Modify Implicit Search Table |
| ISA Enable | | PCIe Base Specification | HW: Full Implementation |
| VGA Enable | | PCIe Base Specification | HW: Full Implementation |
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 5A

| Field | Register | Requirement | Implementation |
|---|---|---|---|
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 5B

METHOD AND APPARATUS FOR MAPPED I/O ROUTING IN AN INTERCONNECT SWITCH

BACKGROUND OF THE INVENTION

Peripheral Component Interconnect Express (PCIe) is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, optionally, a PCI Express switch, and PCI Express endpoints.

In the prior art implementation of a PCI Express switch for routing incoming data packets between root complex and endpoint devices, the transaction layer packet (TLP) routing functions of the switch are hard-coded into the switch. Hard-coding of the switch routing functions is performed during the initial silicon fabrication. If errors are made in the hard-coding of the routing functions during the fabrication process, new revisions of silicon are required to correct the errors. Additionally, if new routing function features are to be added to the device, it would be necessary to fabricate a new revision of the silicon to incorporate the new features. Fabricating new revisions of silicon is an expensive and time-consuming process which undesirably delays the device time-to-market. As the PCIe standard matures it may also be necessary to implement non-standard routing features that may not be included in the standard PCIe devices.

Thus, there is a need for a method and apparatus that will reduce the cost of implementing changes to the TLP routing function of the PCI Express device after initial fabrication of the silicon and that will also reduce the time delay required to implement the changes to the routing function. Additionally, there is a need in the art for implementing non-standard features of PCIe devices into a PCIe switch.

SUMMARY OF THE INVENTION

The present invention provides a system and method for a flexible routing engine in a switch for coupling a CPU to a plurality of I/O devices through a root complex. In a particular embodiment, the switch may be a PCIe switch operating in a PCIe switch fabric topology. In an additional embodiment, the switch may be a RapidIO switch operating in a RapidIO switch fabric topology.

A method for flexible routing in a switch may include receiving a configuration request transaction layer packet at a switch stack of the switch. In accordance with the present invention, a switch stack is port logic that implements the physical layer, data link layer, and transaction/application layer functions of the PCIe protocol. The configuration request transaction layer packet may be generated by a root complex coupled to the switch. The switch stack may then forward the configuration request transaction layer packet received to a switch manager of the switch. The switch manager may then interpret the configuration request transaction layer packet at the switch manager and update at least one table of the switch stack based upon the interpretation of the configuration request transaction layer packet by the switch manager. After updating the tables of the switch stack, the switch manager may then synthesize a configuration completion transaction layer packet and forward the configuration completion transaction layer packet to the root complex.

In a particular embodiment, the switch stack may implement a configuration space Type 0 header format and in an additional embodiment, the switch stack may implement a configuration space Type 1 header format.

In interpreting the configuration request transaction layer packet at the switch manager, the switch manager may run firmware to identify at least one desired behavior of the switch stack. After identifying the desired behavior, the switch manager may update a routing table, an ingress transaction layer packet editing table or an egress transaction layer packet editing table of the switch stack by writing the desired behavior into the tables.

In the present invention, a system for flexible routing in a switch may include a switch comprising two or more switch stacks, wherein the switch stacks may receive a configuration request transaction layer packet generated by a root complex coupled to the switch. The switch may further include a switch manager coupled to the switch stacks. The switch manager may receive a configuration request transaction layer packet forwarded from the switch stacks. The switch manager may interpret the configuration request transaction layer packet update at least one table of the switch stacks based upon the interpretation of the configuration request transaction layer packet by the switch manager. Upon updating the switch stacks, the switch manager may further generate a configuration completion transaction layer packet and may forward the configuration completion transaction layer packet to the root complex.

To update the tables of the switch stack, the switch manager may run firmware to identify at least one desired behavior of the switch stack and may then update a routing table, an ingress transaction layer packet editing table or an egress transaction layer packet editing table based upon the identified desired behavior of the switch stack.

In a specific embodiment, non-standard routing of the transaction layer packet request is provided utilizing mapped I/O routing in the switch. Translation of the address and the requester ID provides for mapped I/O routing within the switch, thus enabling the switch to provide connectivity between multiple root complexes and the various ports of the switch. Translation of the request address and the REQID are implemented utilizing tables that the switch manager is responsible for updating.

These and other advantages of the present invention will become obvious to those of ordinary skill in the art after having read the following detailed description of the preferred embodiments, which are illustrated in the various drawing figures.

BRIEF DESCRIPTION OF THE DRAWINGS

FIG. 5A is a table illustrating an implementation of the present invention for a type 1 configuration header.

FIG. 5B is a table illustrating an implementation of the present invention for a type 0 configuration header.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention is applicable to a general or special purpose computing system wherein multiple root complexes are coupled to a central processing unit and are sharing a group of input/output devices through a common switch fabric. More specifically, the exemplary embodiments described herein are related to a routing mechanism for routing data when the switch fabric utilizes a PCI Express (PCIe) protocol.

Figure 1:
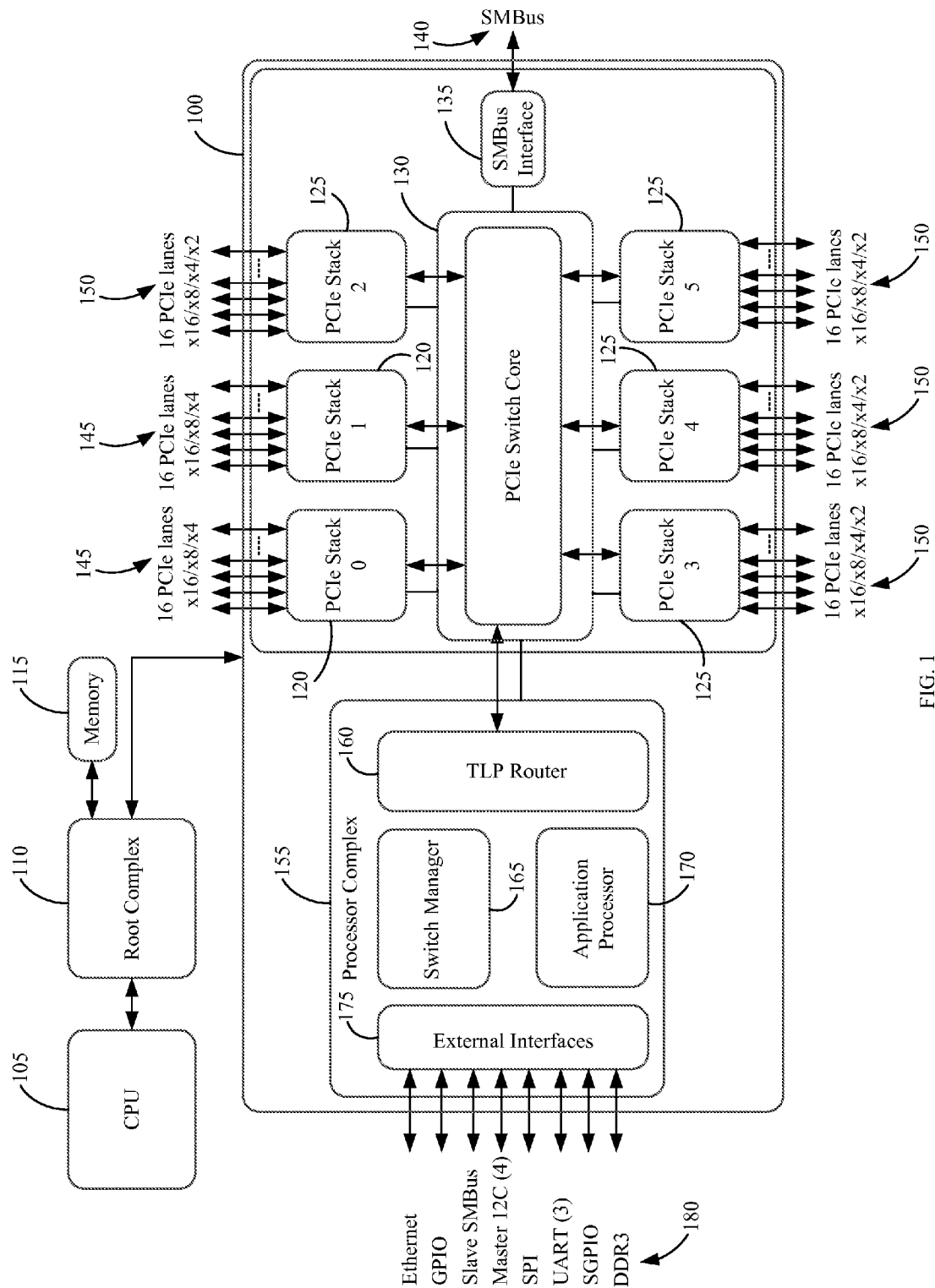
FIG. 1 is a block diagram illustrating a switch having a flexible routing engine in accordance with an embodiment of the present invention.

With reference to FIG. 1, a PCIe switch fabric topology is illustrated in which a root complex 110 of the PCIe system may communicate with multiple endpoints (i.e. I/O devices) of the system through a switch 100. The switch 100 may include a plurality of PCIe stacks 120, 125 coupled to a PCIe switch core 130 through which the root complex 110 may communicate with the endpoints. The endpoints may in turn communicate with the root complex 110 through the PCIe stacks 120, 125 of the switch 100 and additionally, the endpoints may communicate with other endpoints of the PCIe system through the PCIe stacks 120, 125.

In the illustrated embodiment, the PCIe stacks 120 may communicate with the various endpoints via a x16/x8/x4 symmetrical link 145 and the PCIe stacks 125 may communicate with the various endpoints via a x16/x8/x4/x2 symmetrical link 150. As is known in the art PCIe links include a pair of transmit and receive port links, commonly referred to as a lane. In accordance with the PCI Express Specification various combinations of operational lane widths are permitted to support a desired bandwidth.

The root complex 110 is the root of an I/O hierarchy that connects a central processing unit (CPU) 105 and a memory subsystem 115 to the I/O. The root complex 110 of the switch fabric may generate transaction requests to various endpoints initiated by the CPU 105. The memory subsystem 115 may additionally be coupled to the root complex 110 to facilitate the storage and retrieval of data required for the operation of the root complex 110 and the switch 100.

The switch core 130 may additionally be coupled to system management bus 140 through a system management bus interface 135. As is known in the art, a system management bus (SMBus) is a two-wire interface through which various system component chips can communicate with each other and with the rest of the switch fabric. The SMBus often provides a means for debug related communications.

PCIe transactions at the transaction layer may be identified as memory transactions, I/O transactions, configuration transactions or message transactions. Transactions at the transaction layer may include one or more transaction layer packet transmissions required to transfer information between a requester and a completer. In general any device can be a requester or completer.

In a system utilizing a PCIe switch 100, before such transaction layer packets can be generated by a requester of the system to be accepted by a completer, the requester and the completer must be configured to insure compliance with the system transaction layer packet routing scheme. To configure the requester and completer devices, upon start-up of a PCIe switch 100, the software executing on the CPU 105 coupled to the PCIe switch may request that the root complex 110 initiate configuration transactions to read from or write to a configuration register of one or more of the PCIe stacks 120, 125 coupled to the switch core 130. In the prior art, combinational logic that is controlled by configuration registers are implemented in hardware and the hardware registers are accessed by the root complex 110 to discover the presence of a particular function as well as to write to the hardware register to configure the function for standard operation. In the prior art, the root complex 110 transmits configuration transaction layer packets to the switch 100 to configure the functionality of a PCIe stack 120, 125. The configuration transaction layer packet may include a payload for programming a desired behavior into a register of the PCIe stack 120, 125. Upon receipt of the configuration transaction layer packet at the PCIe stack 120, 125, the payload of the packet may be used to directly write the desired behavior into a hardware register of the PCIe stack 120, 125. As such, in accordance with the prior art the hardware registers of the PCIe stacks 120, 125 include the standard registers that may be written to by the root complex 110 to modify their behavior.

In accordance with the present invention, the switch 100 may further include a switch manager 165 running firmware that is responsible for modifying the behavior of the PCIe stacks 120, 125 through the switch core 130.

As shown in FIG. 1, the switch 100 of the present invention may include a processor complex 155 comprising a switch manager 165 and a TLP (transaction layer packet) router 160. In operation, the configuration transaction layer packets from the root complex 110 may be intercepted and rerouted to the switch manager 165 through the switch core 130 and the TLP router 160. Upon receipt of the configuration transaction layer packet, the switch manager 165 may then run firmware to identify a desired behavior for one of the PCIe stacks 120, 125. Upon identification of the desired behavior, the switch manager may write to one or more tables in the PCIe stack 120, 125 to configure the PCIe stack for the desired behavior. In accordance with the present invention, the firmware associated with the switch manager may be updated at any time to correct fabrication errors in the switch 100 or to implement new features into the switch 100.

The processor complex may further include an application processor 170 which may enable additional functionality such as baseboard management control (BMC) and enclosure management capabilities. In operation, the configuration transaction layer packets from the root complex 110 may be intercepted and rerouted to the application processor 170 through the switch core 130 and the TLP router 160. Additionally, the processor complex may include an external interface 175 which may couple to various external protocols 180, including, but not limited to, Ethernet and DDR3.

Figure 2:
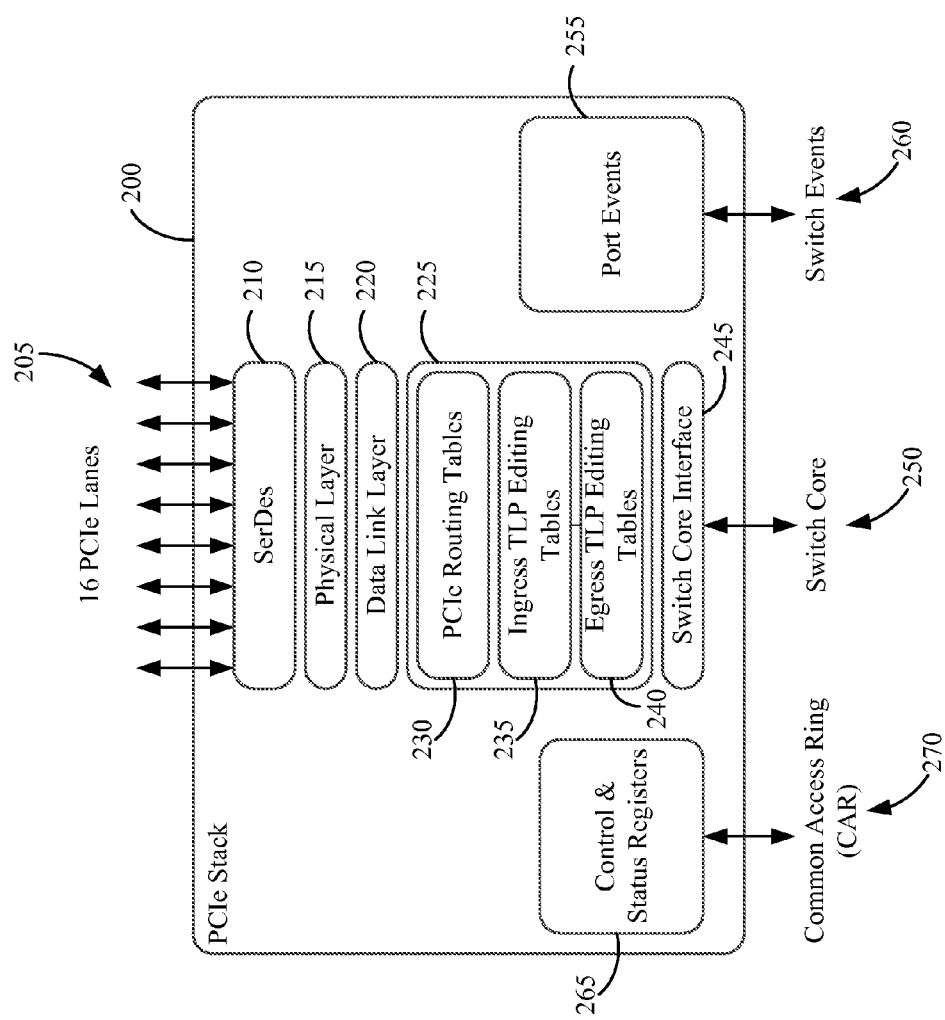
FIG. 2 is a block diagram illustrating a switch stack of a switch having a flexible routing engine in accordance with an embodiment of the present invention.

With reference to FIG. 2, a PCIe stack 200 in accordance with an embodiment of the present invention is illustrated in more detail. As shown in FIG. 2, the PCIe stack 200 may include various interfaces and communication layers. In this embodiment, the PCIe stack 200 may include a serialializer/deserializer (SerDes) interface 210 coupled to an endpoint through the PCIe lanes 205. In an additional embodiment the SerDes interface 210 may be coupled to a root complex or another switch. The SerDes 210 may communicate with a physical layer 215 of the PCIe architecture which may in-turn communicate with a data link layer 220 of the architecture. At the transaction layer 225, the routing of transaction layer packets through the PCIe stack may be controlled by PCIe routing tables 230, ingress TLP editing tables 235 and egress TLP editing tables 240. The PCIe stack may be configured by writing a desired behavior to the PCIe routing tables 230, ingress TLP editing tables 235 and egress TLP editing tables 240. In the present invention, the switch manager 165 runs firmware to identify a desired behavior for the PCIe stack and writes the desired behavior into the PCIe routing tables 230, ingress TLP editing tables 235 and egress TLP editing tables 240 to configure the switch. The PCIe stack 200 may communicate with the switch core 250 through the switch core interface 245. The PCIe stack 200 may further include a port events unit 255 to intercept switch events 260 for the PCIe stack 200 and a control and status register 265 to communicate with a common access ring (CAR) associated with the switch core 250.

In one embodiment of the present invention, there is one routing table 230 for each PCIe stack 200 and multiple ports in the same stack may share the same routing table 230. Additional embodiments are within the scope of the present invention, wherein the multiple routing tables 230 may be implemented and multiple PCIe stacks 200 may share common routing tables 230.

In accordance with the PCIe specification, configuration transaction layer packets (CFG TLPs) target the configuration space of the PCIe device to provide configuration and setup information for the device during enumeration. The PCIe specification defines two formats for the PCIe configuration headers used to configure a PCIe device. The two formats are referred to as type 0 and type 1 headers. Type 0 PCIe configuration headers do not contain a bus number and are interpreted by all devices as being for PCIe configuration addresses on the main PCIe bus. Alternatively, in order to address devices that are not on the main PCIe bus, type 1 PCIe configuration headers that contain a bus number can be used as a mechanism to allow PCIe-PCIe bridges to decide whether or not to pass configuration transaction layer packets from the main PCIe bus to a secondary PCIe bus to allow configuration of PCIe devices on the secondary PCIe bus. In the prior art, these headers were implemented in hardware registers that directly controlled the forwarding of the PCIe configuration transaction layer packets.

The PCIe stacks 200 of the present invention utilize both type 0 and type 1 headers, which are implemented in memory attached to the CPU running the switch firmware, instead of being hardware encoded into the switch 100. As such, upon receiving a type 0 configuration request transaction layer packet from the root complex 110 at a switch stack 200 of the switch 100, instead of updating the routing tables of the switch 225, the switch stack 200 may forward the type 0 configuration request transaction layer packet to the switch manager 165. The switch manager 165 may then interpret the type 0 configuration request transaction layer packet and update the routing tables 225 of the switch stack 200 to configure a PCIe device residing on the main PCIe bus. Additionally, upon receiving a type 1 configuration request transaction layer packet from the root complex 110 at a switch stack 200 of the switch, instead of updating the routing tables of the switch 225, the switch stack 200 may forward the type 1 configuration request transaction layer packet to the switch manager 165. The switch manager 165 may then interpret the type 1 configuration request transaction layer packet and update the routing tables 225 of the switch stack 200 to configure a PCIe device residing on a bus that is downstream of the main PCIe bus.

Figure 3:
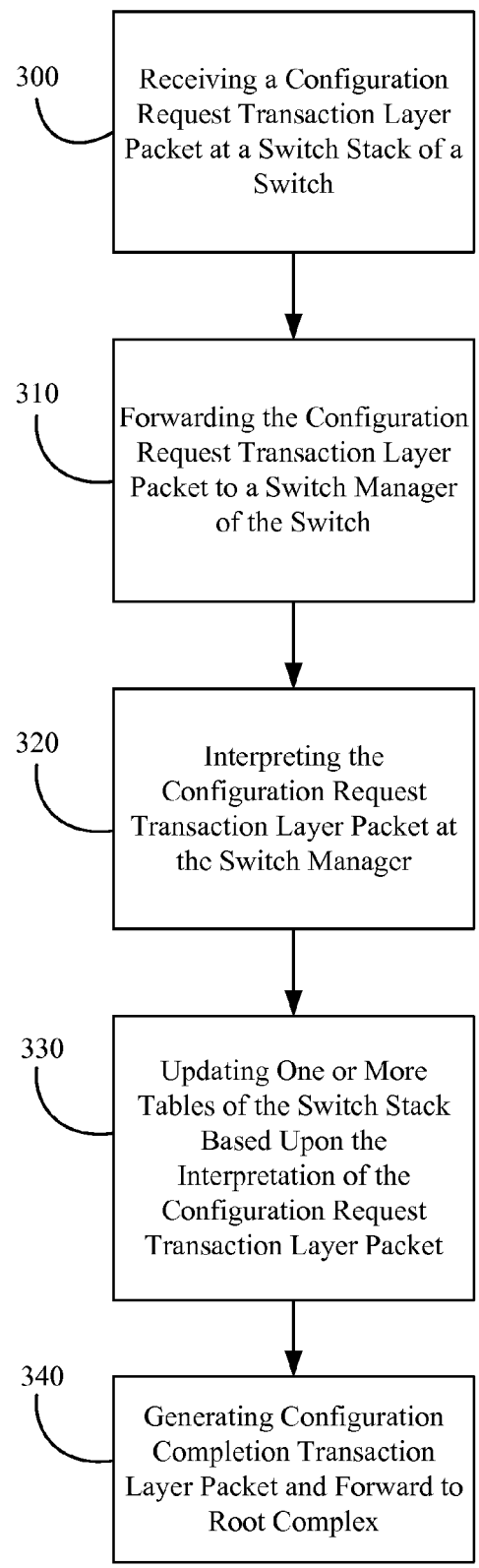
FIG. 3 is a flow diagram illustrating a method of flexible routing in a switch in accordance with an embodiment of the present invention.

With reference to FIG. 3, in general operation the present invention may receive a configuration request transaction layer packet at a switch stack of a switch 300. The configuration request transaction layer packet may then be forwarded to a switch manager of the switch 310. The switch manager may then interpret the configuration request transaction layer packet using firmware 320 and update one or more tables of the switch stack based upon the interpretation of the configuration request transaction layer packet 330. Upon completion of the table update, the switch manager may generate a configuration completion transaction layer packet and forward the packet to the root complex 340.

In a specific embodiment, the switch 100 may include six switch stacks 200, wherein each switch stack 200 may include various capabilities and the capabilities may vary among the six switch stacks 200. In a particular embodiment, each of the switch stacks 200 may comprise up to sixteen PCIe lanes 205 and the PCIe lanes 205 may further be identified as belonging to a port of the switch 100. The ports of the switch may be numbered and a routing table entry may be made for each of the ports of the switch. The port numbering may include an internal port for the switch manager 165 and an internal port for the application processor 170. In a particular embodiment, there may be at most eight ports in a stack, or sixteen ports on the virtual buses. In general, ports of the same stack that are in the same partition will have the same entries in the routing tables. In the present invention, routing tables are a stack resource and the routing tables are shared amongst the ports in a given stack. In addition to the routing established by the routing tables, there are also port based considerations to routing, including Access Control Services (ACS), multicast blocking, Bus Master Enable (BME), etc.

In accordance with the present invention, routing tables 230, ingress TLP editing tables 235 and egress TLP editing tables 240 are a stack resource and the tables are shared among the ports in a given switch stack 200. In the present invention non-multicast TLPs may be routed by ID, memory address, I/O address or implicitly and multicast TLPs may be routed utilizing a multicast vector. As such, the present invention may include an ID search table memory address search table, an IO search address search table, an implicit search table and multicast tables. When the multicast tables are used, a multicast vector with each port as a bit is also used.

Figure 4:
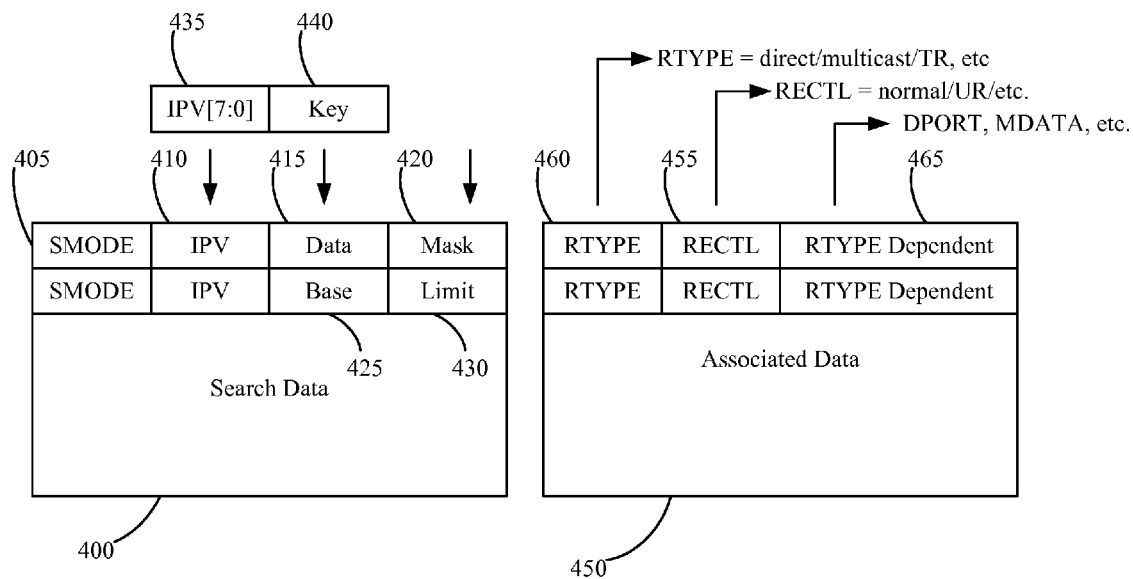
FIG. 4 is a diagram illustrating a generic search in accordance with an embodiment of the present invention.

In general, the routing tables of the present invention are searched as shown with reference to FIG. 4. As shown in FIG. 4, the search data 400 comprises the search mode (SMODE) 405, which is the search criteria (i.e. inside range) and the transaction layer packet (TLP) type that will match (i.e. posted). In the present invention, both criteria and TLP type must match. The search may also include the ingress port vector (IPV) 440 (i.e. within a stack) that the TLP was received on. The key 440, base address 425 limit address 430, data 415, mask 420 or other fields of the received TLP may further be included in the search data. The base address 425 and limit address 430 are the base and limit of the port in the case of a type 1 header, or in the case of a type 0 header, the base address 425 and the limit address 430 are header's base address register (BAR) expressed as a base and a limit. The common associated data 450 and routing exception control (RECTL) 455 are returned from the search to route the TLP. The routing type (RTYPE) 460 returned may be direct, multicast, translated, etc. The routing exception control (RECTL) 455 may include any exceptions to the normal routing. The routing exception control, (RECTL) is returned by the various search tables, as part of the associated data, to determine whether to route the TLP to the DPORT normally, or take some other action. The RECTL field is on a per IPV bit basis. For each IPV bit that is set there is a corresponding RECTL field associated with that bit. The routing type (RTYPE) dependent 465 may include the destination port or where to forward the TLP. A match in a search table occurs when all of the following are true, (1) the ingress port vector (IPV) bit is set for the port that the TLP was received on, (2) the received TLP type matches the TLP type and (3) the search criteria is met.

In establishing the values within the routing tables to be searched, specific bits in the configuration headers are modified to affect the routing of the TLPs. In a specific embodiment, the bits affecting the routing of a type 1 header in accordance with the present invention are shown with reference to the table of FIG. 5A. In an additional embodiment, the bits affecting the routing of a type 0 header in accordance with the present invention are shown with reference to the table of FIG. 5B. As shown in the tables of FIG. 5A and FIG. 5B, in the present invention, firmware in the switch manager 165 modifies specific tables (i.e. implicit search table, memory address table, IO search table, etc.) associated with specific bits of the type 1 and type 0 headers in order to implement the desired routing of the TLPs through the switch fabric. In a specific example, the present invention utilizes firmware and the switch manager 165 to modify the memory address search table to implement routing control for the memory space enable (MSE) and base master enable (BME) bits of the header. As such, in the present invention, firmware is responsible for the MSE and BME bits in the type 1 and type 0 headers.

In accordance with the present invention, standard PCIe registers are exposed to the root complex via the configuration transaction layer packets (CFG TLPs). All CFG TLPs that target a function in the switch are forward to the switch manager and managed by firmware in combination with the switch hardware. In the present invention, the implementation cost of the tables is minimized to provide a simple behavior for the switch hardware to implement.

The previous embodiments described the transparent switch ports of the switch in which PCIe hierarchy isolation is provided between PCIe busses. In the previous embodiments, one root complex enumerates the system through discovery of the switches and the end points. For the transparent switch ports, the configuration status registers with a type 1 header inform the root complex that additional PCIe functions lie downstream of the switch and that the processor should continue to enumerate beyond the switch. Additionally, the configuration status registers with a type 0 header inform the root complex that no additional PCIe functions are downstream of the switch. Following enumeration and discovery, the PCIe system is aware of which PCIe functions are present along with their memory and I/O space requirements.

Often it is desirable to utilize a multihost system employing multiple processors and root complexes. Multihost systems provide increased processing bandwidth and also allow greater system reliability. However, if a second root complex is added to the system, both root complexes will attempt to enumerate and memory map the entire system independently of one another, resulting system operation failure as both processors attempt to service the same system requests.

In order to accommodate multiple root complexes, switch ports that may be configured to be non-transparent may be integrated into a PCIe switch. Non-transparent ports add logical isolation of the root complexes by providing processor domain partitioning and address translation between the memory-mapped spaces of these domains. In the present invention, ports providing translation of addresses to accommodate non-transparent routing are referred to as translated ports. These translated ports provide a path between buses of the root complexes for data to be transferred between the domains. The translated ports expose a type 0 header on both sides of the port and appear as an endpoint to discovery software, although additional devices are actually present on the other side of the port. Processors or root complexes on the respective side of the switch only enumerate until a type 0 header is found.

One method for providing redundant paths between two different route complexes and a single endpoint involves a proprietary switch port behavior referred to as mapped I/O. In mapped I/O (MIO), downstream ports forward memory request transaction layer packets by requester ID (REQID), instead of by address. The REQID comprises the PCIe device's bus number, device number and function number (BDF). The BDF is used to identify each installed PCIe device. Mapped I/O allows different functions in a multi-function PCIe device to communicate with different root complexes. Such a configuration is useful in storage systems utilizing flash controllers in which redundancy desired.

In accordance with the present invention, the mapped I/O routing function is implemented in customized routing tables that firmware and the switch manager are responsible for updating. Implementing the mapped I/O routing function in updatable routing tables allows fabrication errors to be corrected and additional features to be added to the PCIe system. Most importantly, implementing the mapped I/O routing function in updatable routing tables eliminates the need for custom software drivers and allows a standard software driver to be used to communicate with devices on a downstream port of the switch.

Figure 6:
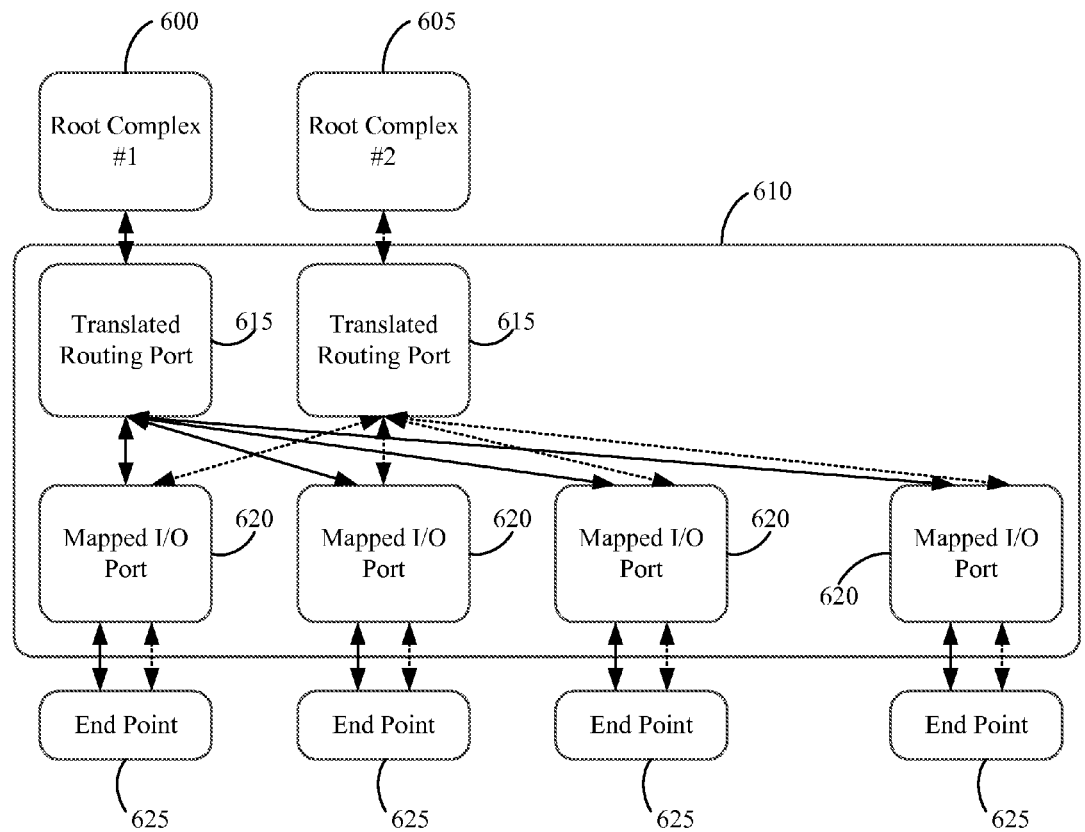
FIG. 6 is a diagram illustrating a mapped I/O routing configuration in accordance with the present invention.

With reference to FIG. 6, in an exemplary system employing mapped I/O routing in accordance with an embodiment of the present invention, a switch 610 may be coupled to a first root complex 600 and to a second root complex 605 through a translated routing port 615 of the switch 610. As previously described, each translated routing port 615 is capable of address translation to provide a data path between the root complexes 600, 605. Each of the translated routing ports 615 may be in communication with a plurality of mapped I/O ports 620. Each of the mapped I/O ports 620 ports may be coupled to one of a plurality of endpoints 625 outside the switch 610. Each of the endpoints 625 may be a PCIe device. As shown, each endpoint 625 can communicate with each of the root complexes 600, 605 and the paths between each endpoint 625 and each of the root complexes 600, 605 are logically separate.

In accordance with an embodiment of the present invention, downstream ports only may be configured as mapped I/O ports 620. No peer-to-peer routing is available when utilizing the mapped I/O port behavior and multicast is not supported.

In an embodiment of the present invention, a mapped I/O port 620 may route a transaction layer request to a translated routing port 615. In this embodiment, memory address requests, I/O address requests and implicit requests are handled differently.

Figure 7:
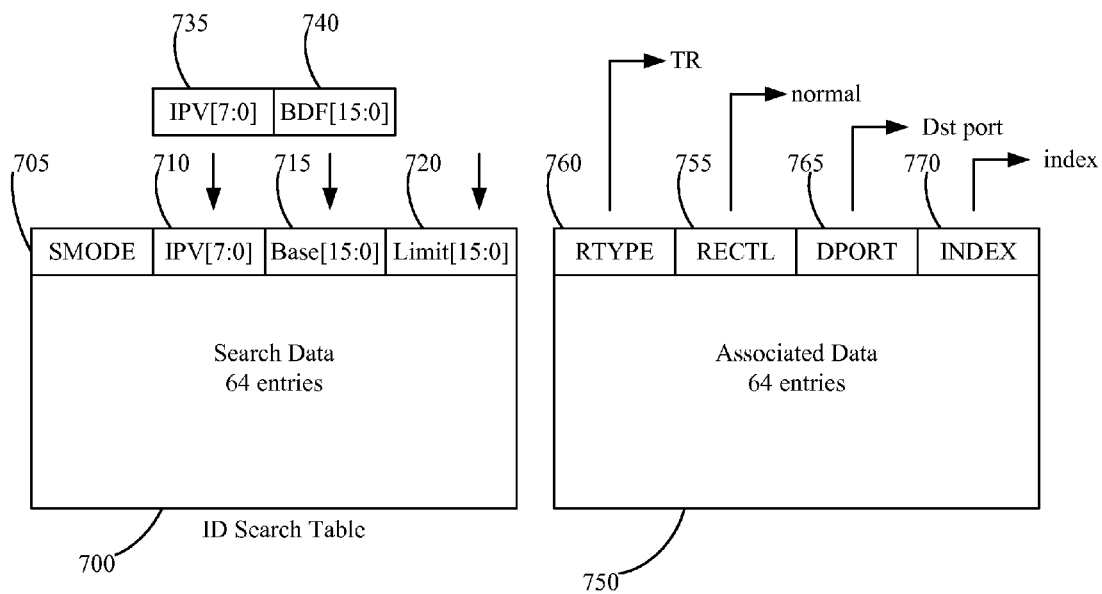
FIG. 7 is a diagram illustrating the routing of a memory address request from a mapped I/O port to a translated routing port.

With reference to FIG. 7, to perform the routing function for a memory address request, an ID search table is searched using the BDF (bus, device function) 740 of the received memory request transaction layer packet. The search data of the ID search table 700 may include a search mode (SMODE) field 705, an ingress port vector (IPV) field, 710 a base field 715 and a limit field 720. Utilizing the ingress port vector IPV 735 and the BDF 740 of the request, associated data 750 of the ID search table may result. The associated data 750 may include a routing type (RTYPE) field 760, a routing exception control (RECTL) field 755, a destination port (DPORT) field 765 and an index field 770. Based on the result from the ID search table, the transaction layer packet is routed, unmodified to the destination port indicated by the DPORT field 765.

Figure 8:
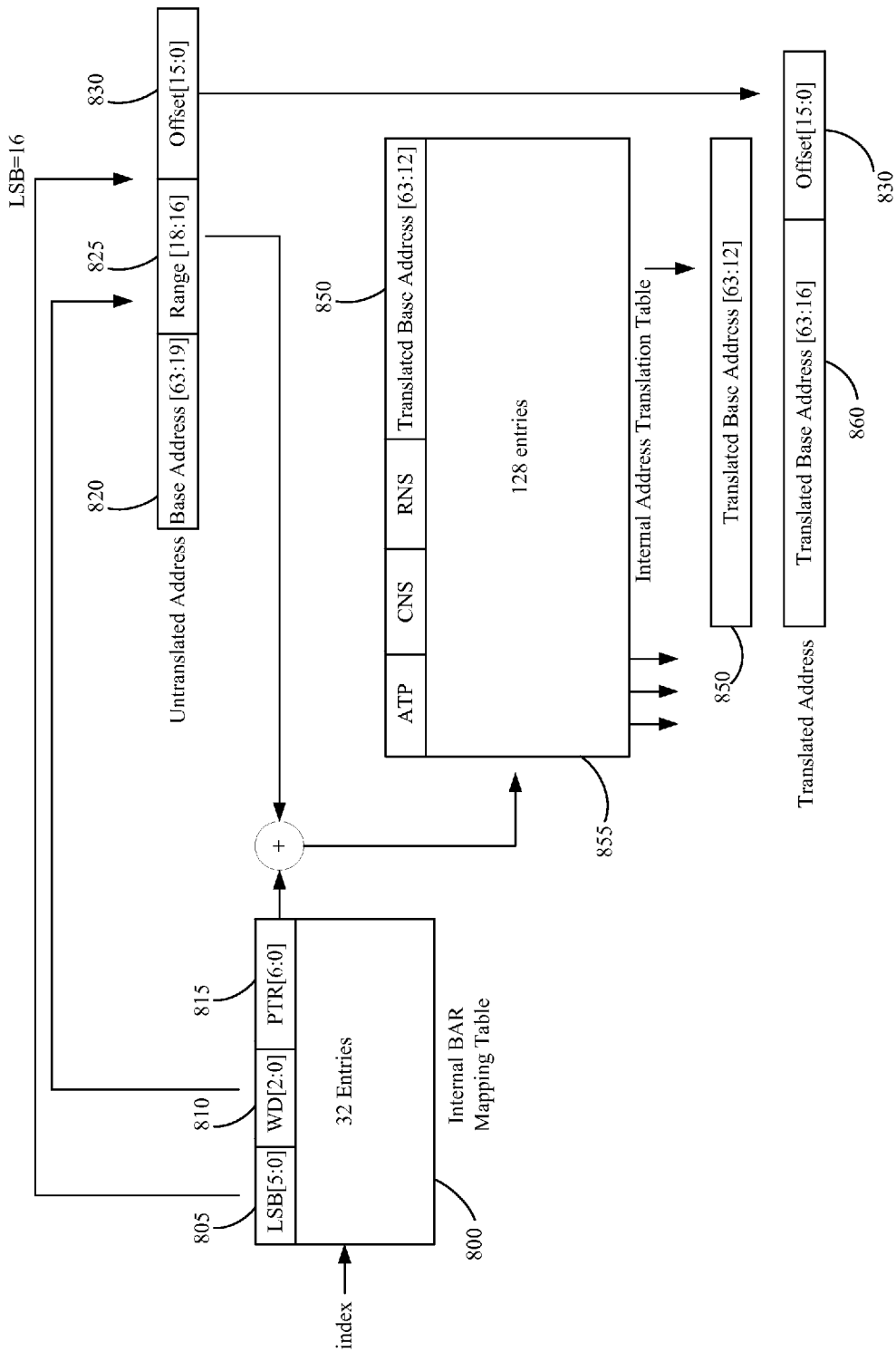
FIG. 8 is a diagram illustrating the address translation of the memory address for a request routed from a mapped I/O port to a translated routing port.

Address translation of the transaction layer packet occurs in the egress translated routing port as shown with reference to FIG. 8. As shown, an index, along with the untranslated address is used to generate the translated address. In this embodiment, an index is used to access an internal BAR (base address register) mapping table 800 comprising a least significant bit (LSB) 805, a width (WD) 810 and a pointer (PTR) 815.

The index may be obtained on ingress lookup and the internal BAR mapping table may be at the destination port. The LSB 805 points to the least significant bit of the range field 825 in the untranslated address. An LSB between 0 and 12 inclusive is valid, and will result in not translation. The width field 810 determines the width of the range field 825 and a width of zero is valid. The range field 825 is added to the PTR field 815 to access the internal address translation table 855 to generate the translated base address 850. The translated base address 860 may then be added to the offset 830 to generate the desired translated address. As shown, the offset 830 overwrites the overlapping bits of the translated base address 860.

Figure 9:
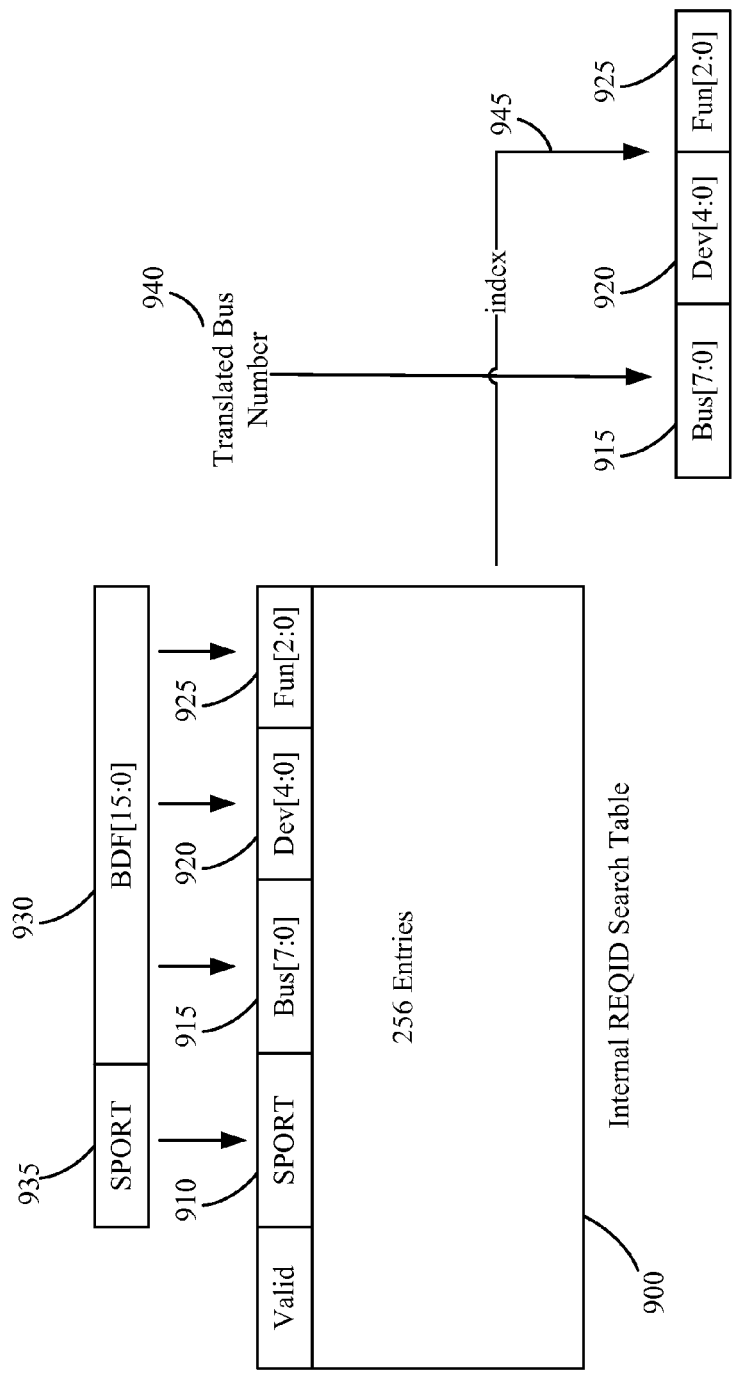
FIG. 9 is a diagram illustrating the REQID translation for a request routed from a mapped I/O port to a translated routing port.

The translation of the requester ID (REQID) also occurs at the egress TR translated routing port as shown with reference to FIG. 9. The internal REQID search table 900 is searched for a match with the requester ID BDF (bus, device, function) 930 and the source port (SPORT) 935. The fields of the internal REQID search table 900 may include source port (SPORT) field 910, bus field 915, device field 920 and function field 925. The device number 920 and function number 925 of the matching BDF from the internal REQID search table are overwritten with the index 945 and the bus number 915 of the matching BDF is overwritten with the translated bus number 940 to generate the translated REQID.

Figure 10:
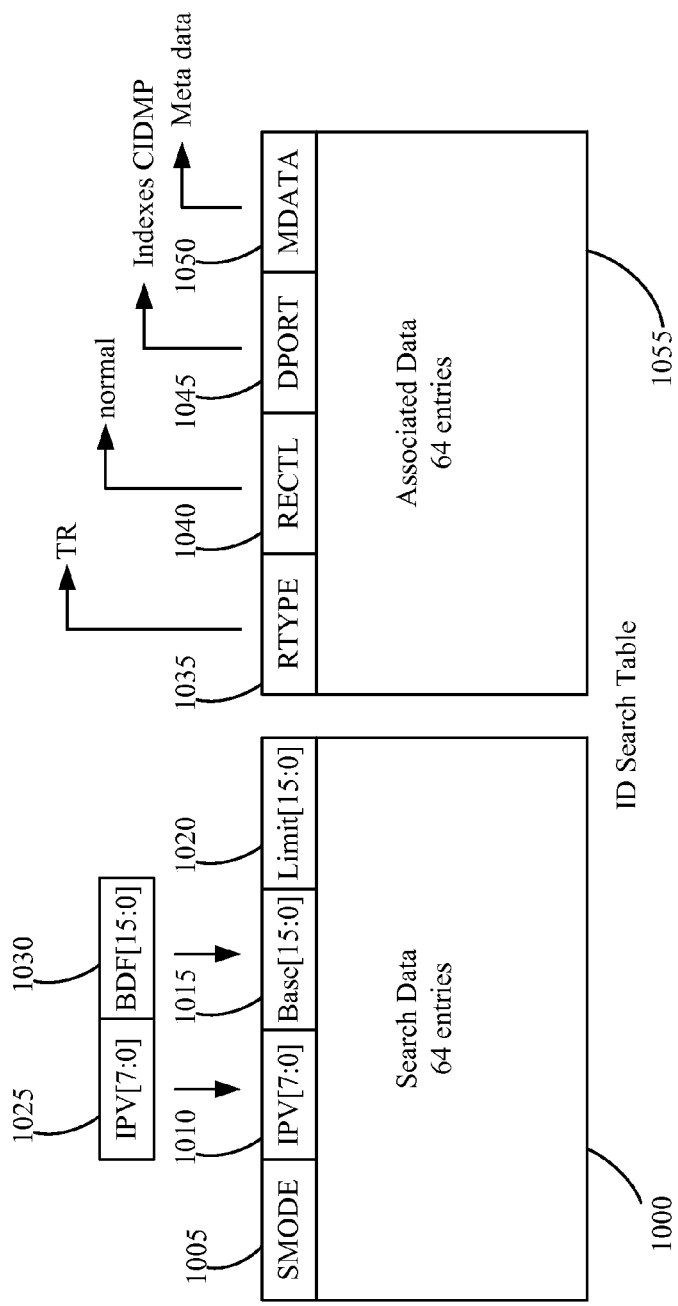
FIG. 10 is a diagram illustrating the routing and translation of a memory address completion for a request routed from a mapped I/O port to a translated routing port.
Figure 11:
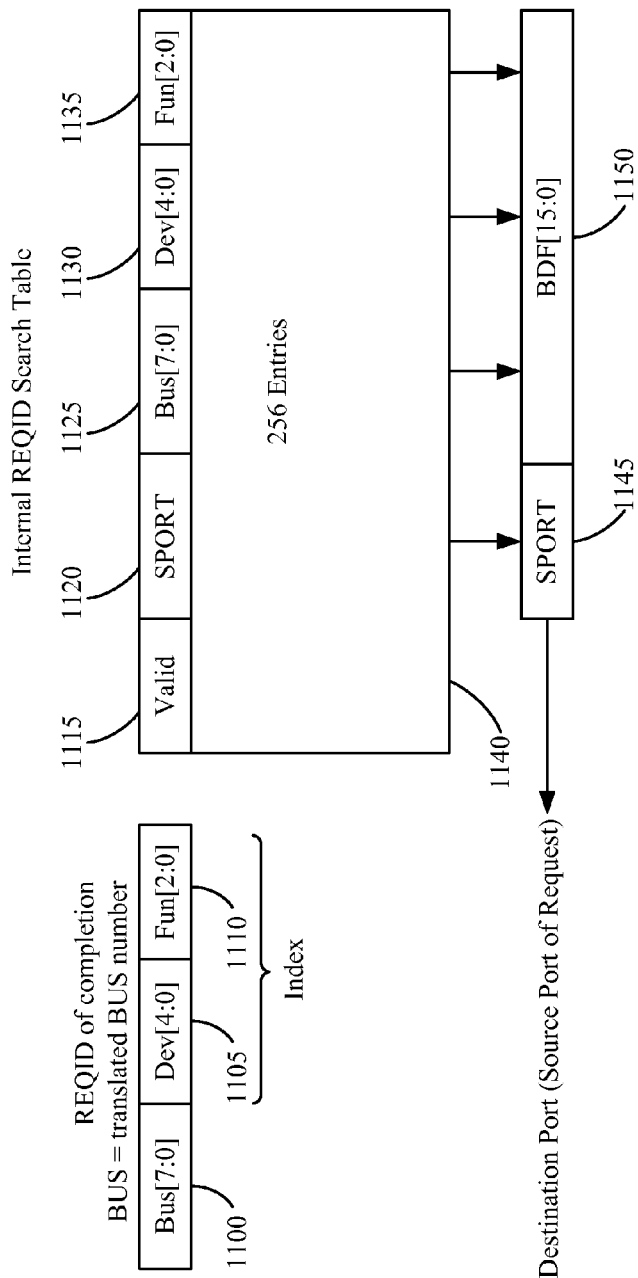
FIG. 11 is a diagram illustrating the routing of an implicit request.

After the request has been forwarded to the destination port, a completion may be generated and routed to the original source of the request. With reference to FIG. 10 and FIG. 11, the routing and translation of the completion is illustrated. As shown in FIG. 10, an ID search table may comprise search data 1000 with fields including search mode (SMODE) 1005, ingress port vector (IPV) 1010, base address 1015 and limit address 1020. The ID search table is searched to identify the routing of the completion. The results of the search may comprise associated data 1055 with fields including routing type (RTYPE) 1035, routing exception control (RECTL) 1040, destination port (DPORT) 1045 and meta data (MDATA) 1050. For routing of the completion, RTYPE 1035 is TR (translated routing) and the destination port 1045 indexes a completer ID mapping table. The RTYPE 1035 of TR triggers a search of an internal REQID search table 1140 shown in FIG. 11. The internal REQID search table may include a valid field 1115, a source port (SPORT) field 1120, a bus field 1125, a device field 1130 and a function field 1135. The device 1105 and the function 1120 of the REQID of the completion may be used to index the internal REQID search table, wherein the bus number 1100 of the REQID of the completion is equivalent to the translated bus number previously identified. The source port 1120 returned from the internal REQID search table is the source port used to route the packet to the destination port. In this embodiment, the BDF of the REQID is overwritten with the contents returned from the internal REQID search table (BDF 1150) and the completer ID is overwritten with the value of the completer ID mapping table.

Figure 12:
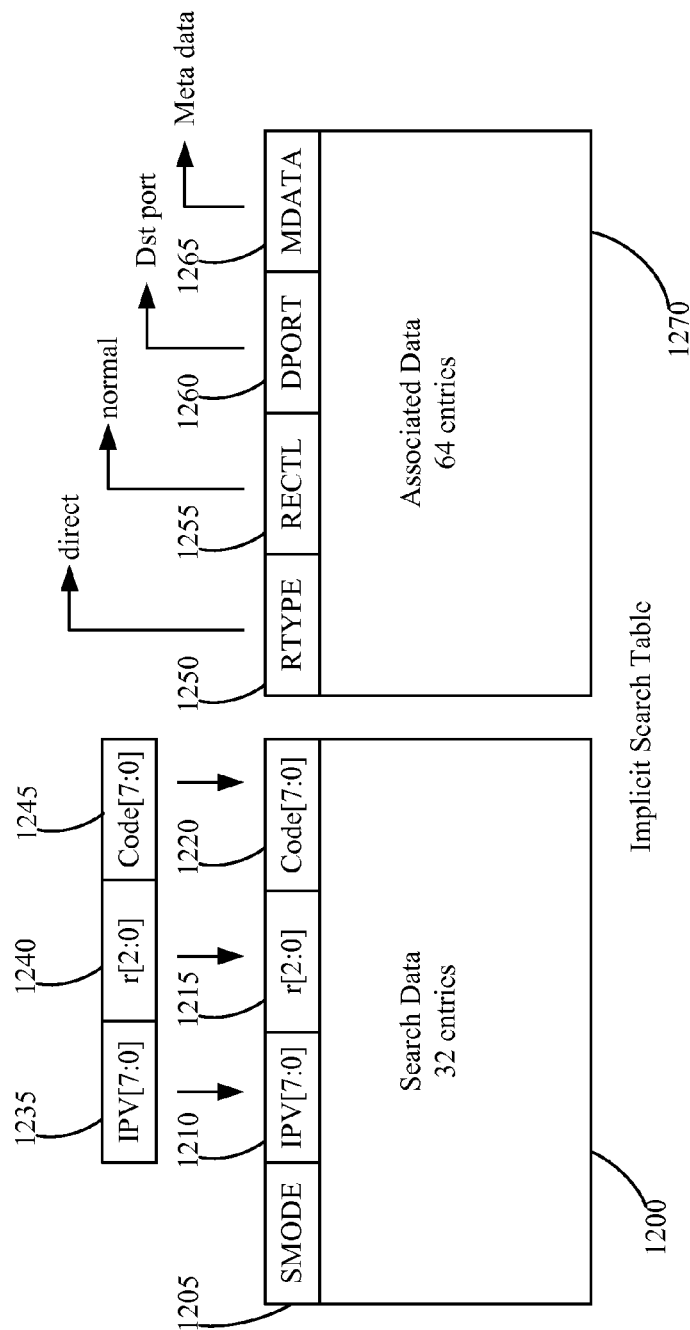
FIG. 12 is a diagram illustrating address routing for a request routed from a translated routing port to a mapped I/O port.

In an additional embodiment, an implicit request may be routed as shown with reference to FIG. 12. An implicit search table is used to route the implicit request. The search data 1200 of the implicit search table may include a search mode (SMODE) field 1205, an ingress port vector (IPV) field 1210, an r[2:0] field 1215 and a code[7:0] field 1220. The r[2:0] field is extracted from the TLP header, this is the message routing field, and indicates how to route the message. The code[7:0] field 1220 is extracted for the TLP header, this is the message code field, and indicates the type of message. The IPV 1235, r[2:0] 1240 and code[7:0] 1245 of the request may be used to access the implicit search table. The associated data 1270 returned from the search field may include routing type (RTYPE) 1250, routing exception control (RECTL) 1255, destination port (DPORT) 1260 and meta data (MDATA) 1265. As shown in FIG. 12, the implicit search table is searched and the possible results for RTYPE may be direct, translated, hardware and REQID. If the RTYPE result is direct, the request is routed to the destination port. If the RTYPE is translated, the request is routed to the destination port with REQID translation. If the RTYPE is hardware, the request is routed by hardware. If the RTYPE is REQID, the ID search table (previously described) is searched with the REQID to determine the route. In the present invention, firmware programs any implicit route to the root complex by searching the implicit search table with RTYPE=REQID. Hardware will then search the ID search table with REQID and the destination port will be programmed to be an upstream port attached to the root complex. With transparent routing, the virtual wire is per partition. In the present invention, the virtual wire is determined by the REQUID of the INTx. When the implicit search table indicates hardware routing, the ID search table is still accessed to determine the destination port, which is used to determine the virtual wire, via port configuration.

Figure 13:
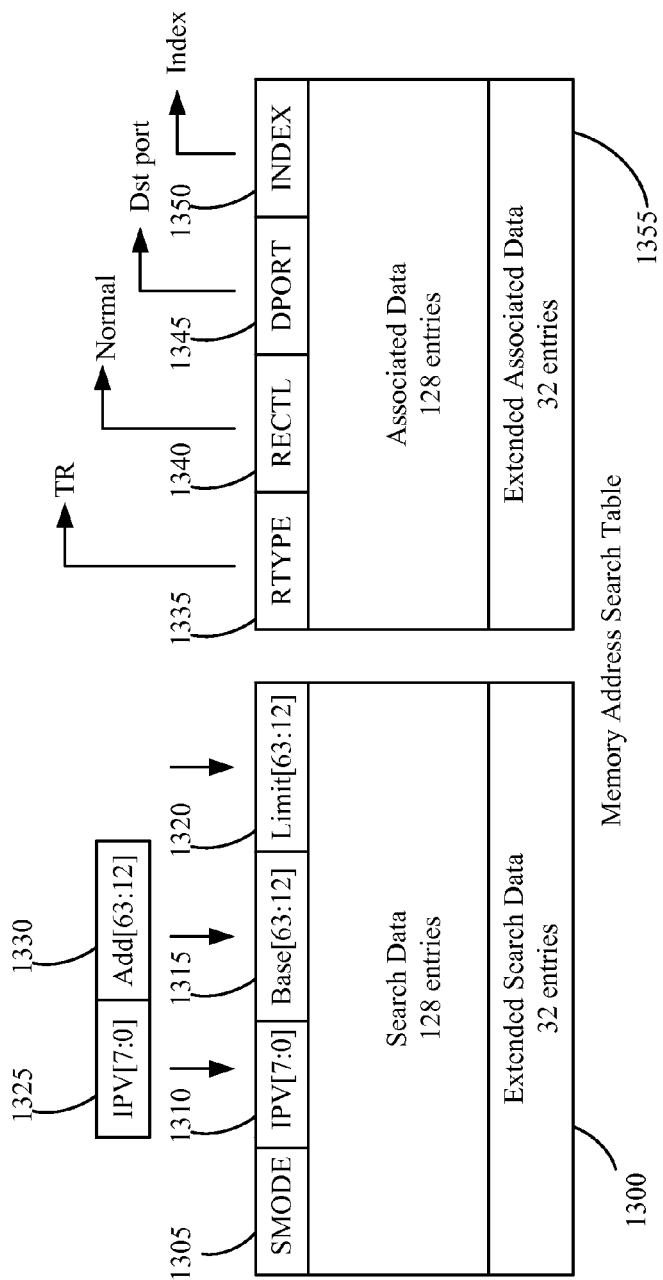
FIG. 13 is a diagram illustrating the address translation of a request routed from a translated routing port to a mapped I/O port.

In an additional embodiment, a request received at a translated routing port may be routed to a mapped I/O port. FIG. 13 illustrates an additional embodiment in which the request may be routed from a translated routing port to a mapped I/O port. With reference to FIG. 13, a memory address search table and an extended memory address search table may be searched, wherein the routing type is defined to be translated routed. The additional extended memory address search table comprises the base address registers (BARs) facing the external port. As such, in a particular embodiment, the extended search data includes 32 entries in addition to the 128 entries in the search data to accommodate the translated routing ports. The search data and the extended search data of the memory address search table 1300 may include a search mode (SMODE) field 1305, an ingress port vector (IPV) field 1310, a base field 1315 and a limit field 1320. The ingress port vector 1325 and the address 1330 are used to access the memory address search table 1300. The associated data and the extended associated data 1355 may include a routing type (RTYPE) field 1335, a routing exception control field (RECTL) 1340, a destination port (DPORT) field 1345 and an index field 1350.

Figure 14:
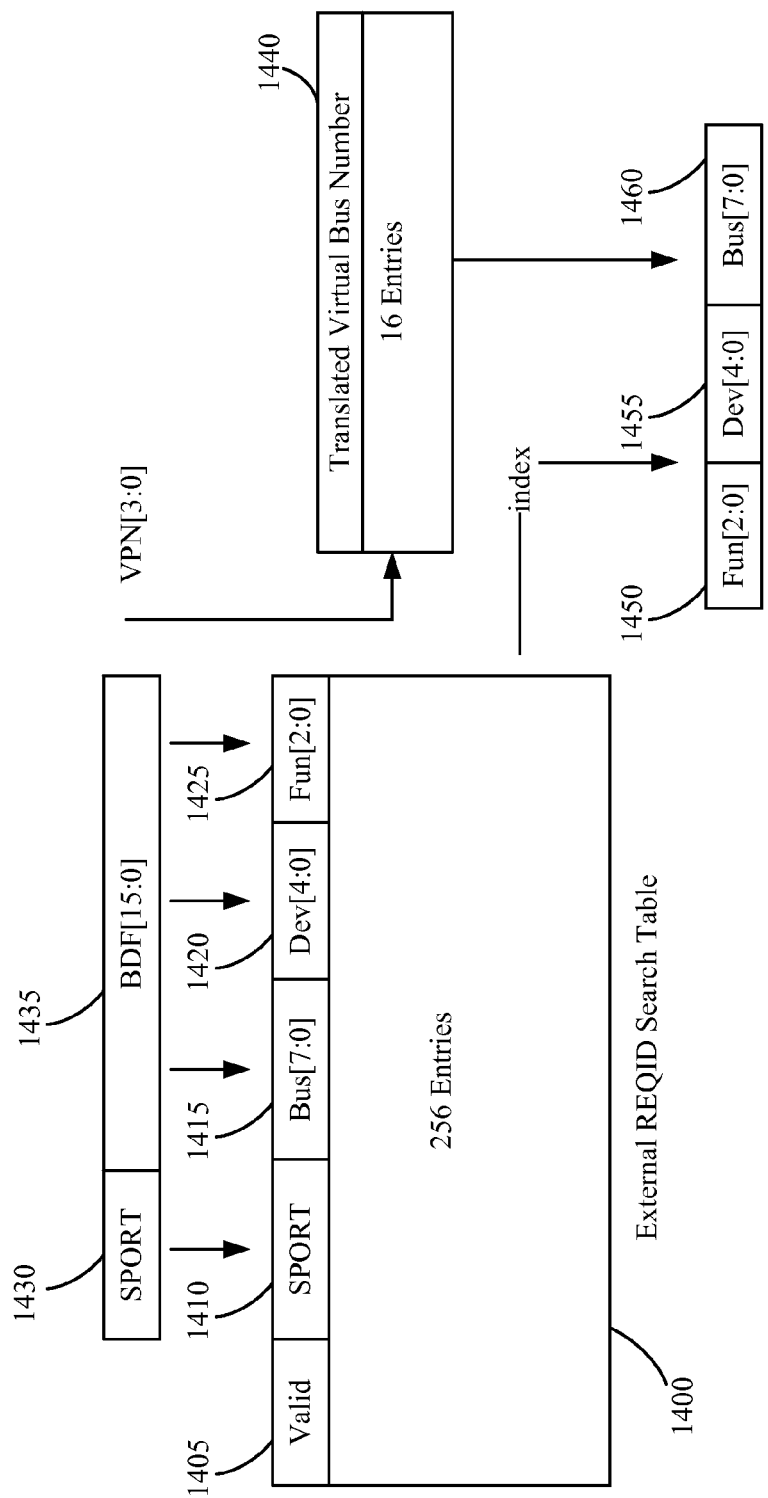
FIG. 14 is a diagram illustrating the REQID translation of a request routed from a translated routing port to a mapped I/O port.

Translation of the REQID is performed as illustrated in FIG. 14. To translate the REQID of the request, the source port (SPORT) 1430 and the REQID BDF (bus, device, function) field 1435 are used to search an external REQID search table 1400. The external REQID search table may include a valid field 1405, a source port (SPORT) field 1410, a bus number field 1415, a device field 1420 and a function field 1425. To translate the REQID, the device number 1455 and function number 1450 are overwritten with the index from the external REQID search table 1400 and the bus number 1460 is overwritten with the translated virtual bus number 1440.

Figure 15:
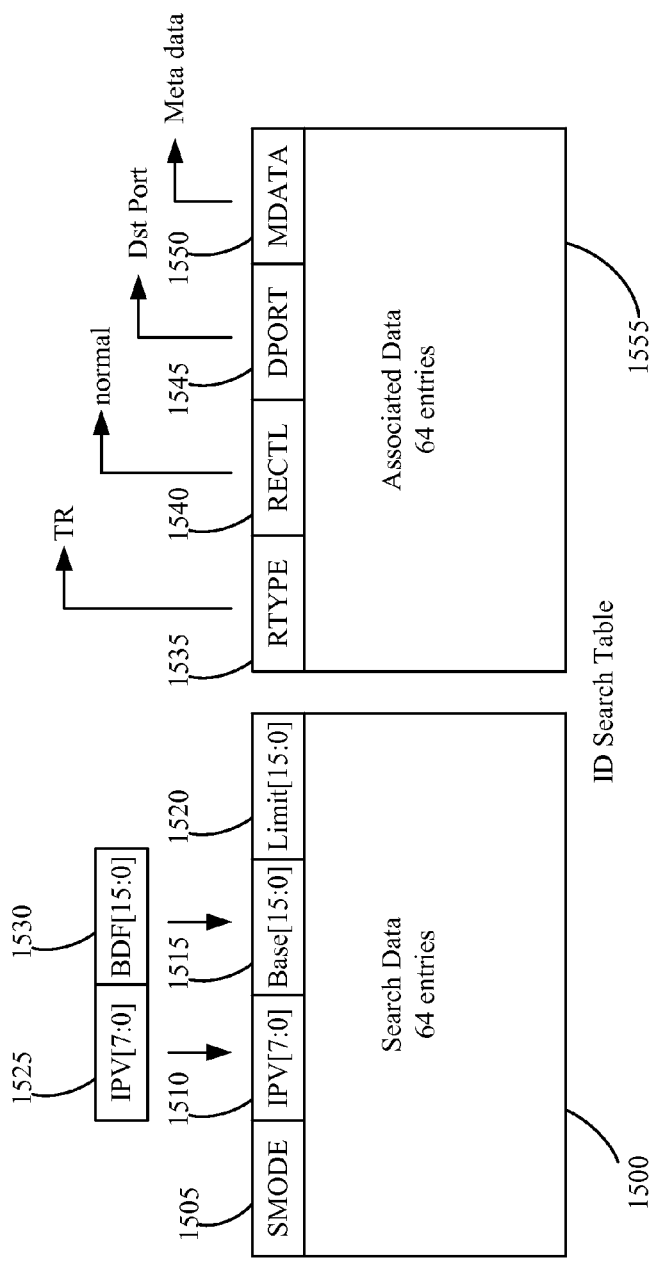
FIG. 15 is a diagram illustrating the REQID routing of a completion for a request routed from a translated routing port to a mapped I/O port.

After the REQID has been translated, the completion may be routed as shown with reference to FIG. 15. To route the completion, an ID search table is searched at the ingress peer-to-peer port. The search data of the ID search table 1500 may include a search mode (SMODE) field 1505, an ingress port vector (IPV) field 1510, a base field 1515 and a limit field 1520. The ingress port vector (IPV) field 1535 and BDF (bus, device, function) field 1530 may be used to access the ID search table. The associated data 1555 resulting from the search of the ID search table may include routing type (RTYPE) 1535, routing exception control (RECTL) 1540, destination port (DPORT) 1545 and meta data (MDATA) 1550. Based upon the results of the search, the translation layer packet request may be routed according to the destination port 1545 of the associated data 1555.

Figure 16:
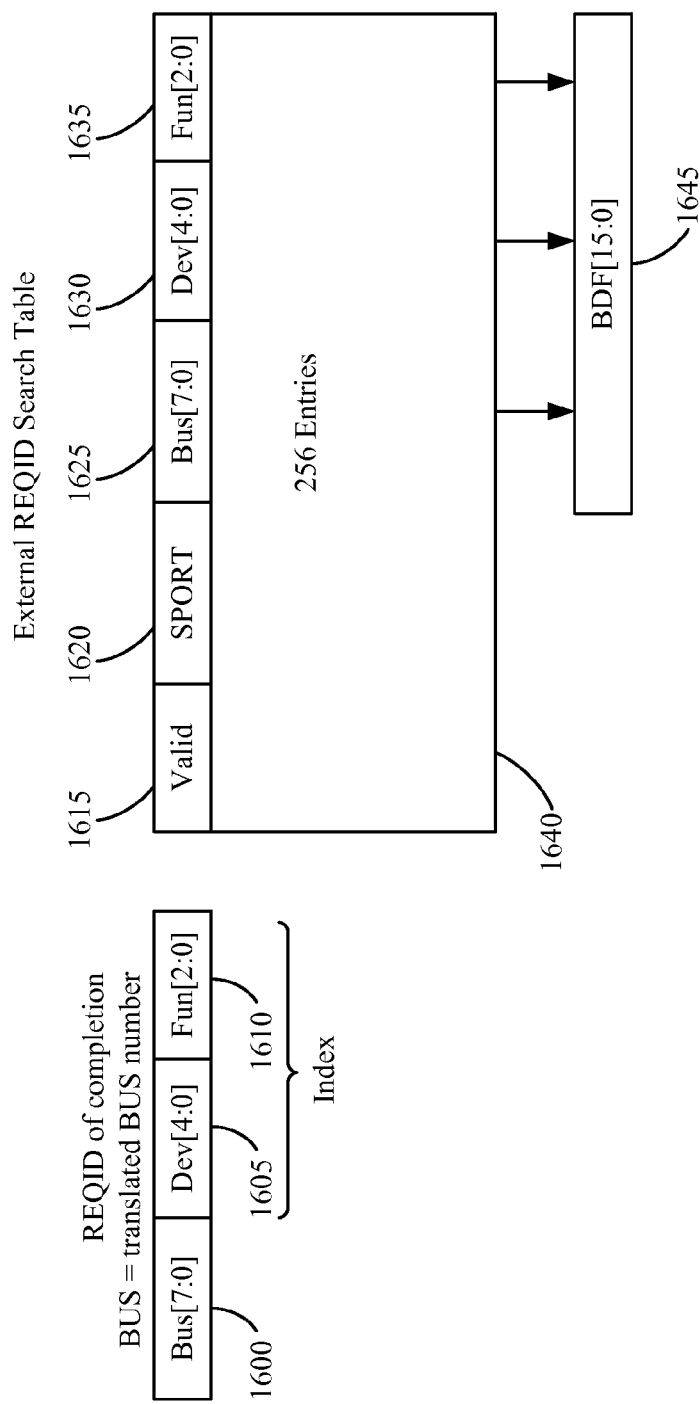
FIG. 16 is a diagram illustrating the REQID translation of completion for a request routed from a translated routing port to a mapped I/O port.

After the completion has been routed to the destination port, the REQID of the completion may be translated at the egress translated routing port as shown with reference to FIG. 16. To translate the REQID of the completion, the device number 1605 and function number 1610 of the REQID of the untranslated completion are used to index the external REQID search table 1640 and the resulting BDF 1645 is used for the translated REQID field. The bus number 1600 of the REQID of the completion is equal to the translated bus number. The external REQID search table may include a valid field 1615, a source port (SPORT) field 1720, a bus number field 1625, a device field 1630 and a function field 1635 that are used to complete the resulting BDF (bus, device function) field 1645.

Figure 17:
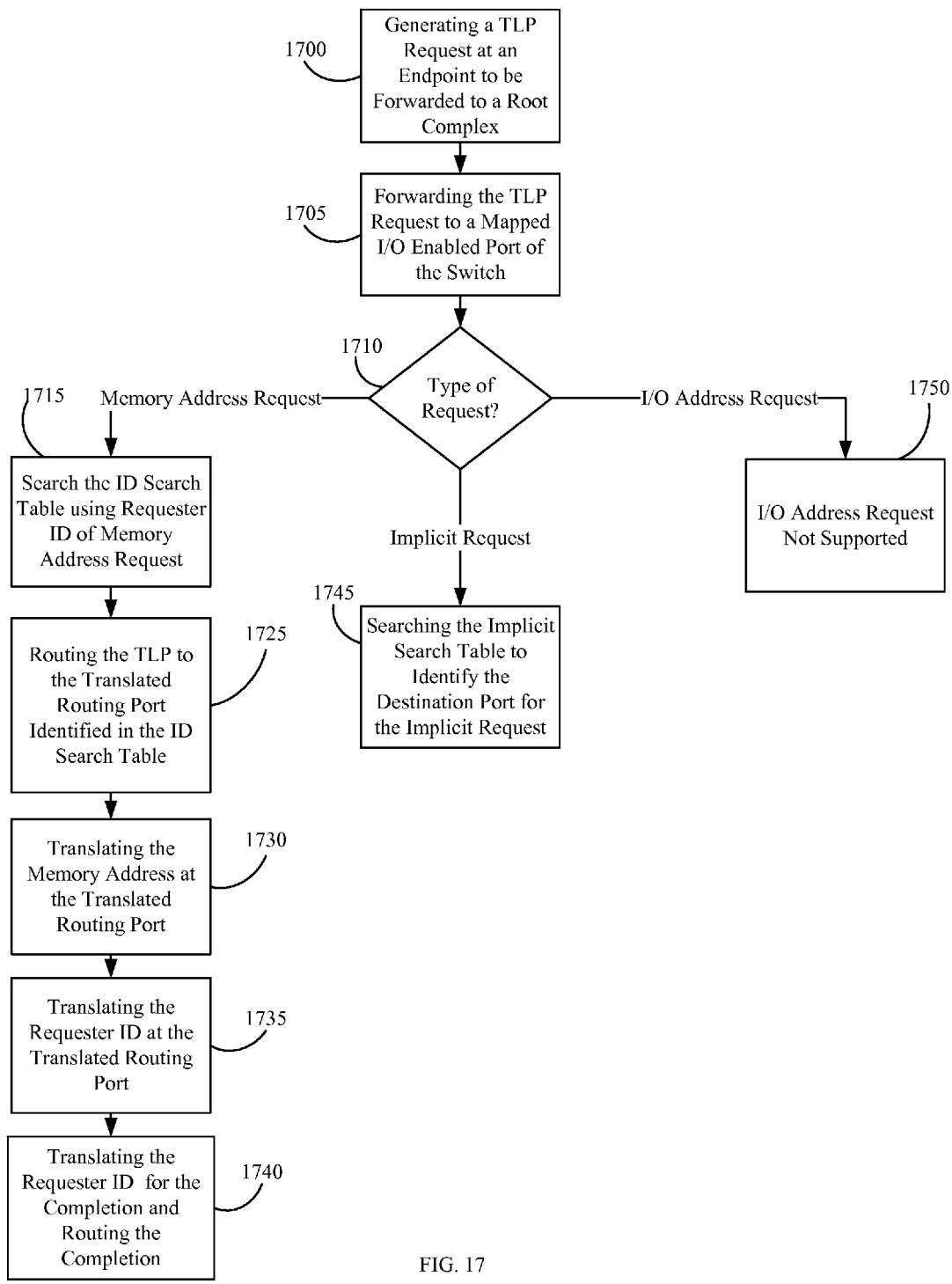
FIG. 17 is a flow diagram illustrating mapped I/O in accordance with an embodiment of the present invention.

In operation of the invention, as shown with reference to FIG. 17, a method in accordance with the present invention comprises generating a transaction layer packet at an endpoint to be forwarded to a root complex 1700. In this embodiment, the transaction layer packet is then forwarded to a mapped I/O enabled port of the switch 1705. The type of request is then determined from the transaction layer packet 1710. If the transaction layer packet request type is an I/O address request, the packet is forwarded to the switch manager because I/O address requests are not supported by the mapped I/O enabled port 1750. If the type of request is an implicit request, the implicit search table is searched to identify the destination port 1745 and the packet is routed to the destination port. If the type of request is a memory address request, the ID search table is searched using the REQID of the memory address request 1715. The packet is then routed to the translated routing port identified by the ID search table 1725. The memory address of the packet is then translated at the translated routing port 1730 and the REQID of the packet is translated at the translated routing port 1735. After the packet has been forwarded, a completion is generated and the requester ID is translated prior to routing the completion to the source port 1740.

In various embodiments, the switch 100 is implemented in an integrated circuit of an integrated circuit device, which may include an integrated circuit package containing the integrated circuit. In some embodiments, the switch 100 is implemented in a single integrated circuit die. In other embodiments, the switch 100 is implemented in more than one integrated circuit die of an integrated circuit device which may include a multichip package containing the integrated circuit die.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for mapped I/O routing in an interconnect switch, the method comprising:
   receiving a transaction layer packet at a mapped I/O enabled port of a switch, the transaction layer packet comprising a memory address and a requester identification (ID);
   when the transaction layer packet is a memory address request, searching an ID search table using the requester ID of the transaction layer packet to identify a translated routing port;
   routing the transaction layer packet to a translated routing port identified in the ID search table;
   when the transaction layer packet is an I/O address request, not using an I/O search table to route the transaction layer packet;
   translating the memory address at the translated routing port by accessing an internal address translation table to generate a translated base address and adding the translated base address to an offset of the memory address, wherein the translated base address and the offset of the memory address comprise one or more overlapping bits and adding the translated base address to the offset of the memory address overwrites the overlapping bits of the translated base address with the offset of the memory address to generate a translated memory address; and translating the requester ID at the translated routing port to generate a translated requester ID.

2. The method of claim 1, wherein the transaction layer packet is a Peripheral Component Interconnect Express (PCIe) transaction layer packet.

3. The method of claim 1, wherein the switch is a RapidIO switch.

4. The method of claim 1, wherein translating the requester ID at the translated routing port to generate a translated requester ID further comprises searching an internal REQID search table for a match with the requester ID BDF (bus, device, function) number.

5. The method of claim 1, further comprising:
generating a completion;
untranslating the translated requester ID to generate an untranslated requester ID; and
routing the completion to the mapped I/O enabled port based upon the untranslated requester ID.

6. The method of claim 1, wherein the ID search table is implemented in firmware of the interconnect switch.

7. The method of claim 1 further comprising:
when the transaction layer packet is an implicit request, searching an implicit search table to identify a translated routing port of the at least one translated routing port.

8. The method of claim 1 further comprising:
when the transaction layer packet is an implicit request, searching an implicit search table to identify a translated routing port of the at least one translated routing port; and
when the results from the search of the translated routing port indicate routing by requester ID, searching the ID search table using the requester ID of the transaction layer packet to identify a translated routing port of the at least one translated routing port.

9. A switch comprising:
at least one translated routing port;
at least one mapped I/O enabled port coupled to the at least one translated routing port, the mapped I/O enabled port configured for receiving a transaction layer packet, the transaction layer packet comprising a memory address and a requester identification (ID), the mapped I/O enabled port configured for searching an ID search table using the requester identification (ID) of the transaction layer packet to identify a translated routing port of the at least one translated routing port when the transaction layer packet is a memory address request, for routing the transaction layer packet to the translated routing port identified in the ID search table and for not using an I/O search table to route the transaction layer packet when the transaction layer packet is an I/O address request; and
wherein the translated routing port is configured for translating the memory address of the transaction layer packet at the translated routing port by accessing an internal address translation table to generate a translated base address and adding the translated base address to an offset of the memory address, wherein the translated base address and the offset of the memory address comprise one or more overlapping bits and adding the translated base address to the offset of the memory address overwrites the overlapping bits of the translated base address with the offset of the memory address to generate a translated memory address and translating the requester ID at the translated routing port to generate a translated requester ID.

10. The switch of claim 9, wherein the transaction layer packet is a Peripheral Component Interconnect Express (PCIe) transaction layer packet.

11. The switch of claim 9, wherein the mapped I/O enabled port is configured for searching an implicit search table to identify a translated routing port of the at least one translated routing ports when the transaction layer packet is an implicit request and is configured to route the transaction layer packet to the translated routing port identified in the implicit search table when the transaction layer packet is an implicit request.

12. The switch of claim 9, wherein the identified translated routing port is further configured for translating the requester ID to generate a translated requester ID by searching an internal requester ID search table for a match with the requester ID BDF (bus, device, function) number.

13. The switch of claim 9, wherein the translated routing port is further for:
generating a completion;
untranslating the translated requester ID to generate an untranslated requester ID; and
routing the completion to the mapped I/O enabled port based upon the untranslated requester ID.

14. The switch of claim 9, wherein the ID search table is implemented in firmware of the interconnect switch.

15. The switch of claim 9, wherein the switch is a RapidIO switch.

16. The switch of claim 9 wherein the mapped I/O enabled port is configured for searching an implicit search table to identify a translated routing port of the at least one translated routing port when the transaction layer packet is an implicit request and when the results from the search of the translated routing port indicate routing by requester ID the mapped I/O enabled port is configured for searching the ID search table using the requester ID of the transaction layer packet to identify a translated routing port of the at least one translated routing port.

17. A switch for mapped I/O routing, the switch comprising:
at least one translated routing port;
at least one mapped I/O enabled port coupled to the at least one translated routing port, the mapped I/O enabled port configured for receiving a Peripheral Component Interconnect Express (PCIe) transaction layer packet, the transaction layer packet comprising a memory address and a requester identification (ID), the mapped I/O enabled port configured for searching an ID search table using the requester identification (ID) of the PCIe transaction layer packet to identify a translated routing port of the at least one translated routing port when the PCIe transaction layer packet is a memory address request, for routing the PCIe transaction layer packet to the translated routing port identified in the ID search table when the PCIe transaction layer packet is a memory address request, for searching an implicit search table to identify a translated routing port of the at least one translated routing ports when the PCIe transaction layer packet is an implicit request, for routing the PCIe transaction layer packet to the translated routing port identified in the implicit search table when the PCIe transaction layer packet is an implicit request and for not using an I/O search table to route the transaction layer packet when the transaction layer packet is an I/O address request; and and wherein the translated routing port is further configured for translating the memory address of the identified PCIe transaction layer packet at the translated routing port by accessing an internal address translation table to generate a translated base address and adding the translated base address to an offset of the memory address, wherein the translated base address and the offset of the memory address comprise one or more overlapping bits and adding the translated base address to the offset of the memory address overwrites the overlapping bits of the translated base address with the offset of the memory address to generate a translated memory address; and translating the requester ID at the translated routing port to generate a translated requester ID.

18. The switch of claim 17, wherein the translated routing port is further configured for translating the requester ID to generate a translated requester ID by searching an internal requester ID search table for a match with the requester ID BDF (bus, device, function) number.

19. The switch of claim 17, wherein the translated routing port is further configured for:
  generating a completion;
  untranslating the translated requester ID to generate an untranslated requester ID; and
  routing the completion to the mapped I/O enabled port based upon the untranslated requester ID.

* * * * *